(12) United States Patent
Nilsson et al.

(10) Patent No.: US 11,296,529 B2
(45) Date of Patent: Apr. 5, 2022

(54) OUTPUT RECTIFIER AND ARRANGEMENT COMPRISING AN OUTPUT RECTIFIER

(71) Applicant: ScandiNova Systems AB, Uppsala (SE)

(72) Inventors: Per Nilsson, Uppsala (SE); Magnus Graas, Uppsala (SE)

(73) Assignee: ScandiNova Systems AB

( * ) Notice: Subject to any disclaimer, the term of this patent is extended or adjusted under 35 U.S.C. 154(b) by 0 days.

(21) Appl. No.: 17/057,032

(22) PCT Filed: May 20, 2019

(86) PCT No.: PCT/EP2019/062915
§ 371 (c)(1),
(2) Date: Nov. 19, 2020

(87) PCT Pub. No.: WO2019/224136
PCT Pub. Date: Nov. 28, 2019

(65) Prior Publication Data
US 2021/0313818 A1     Oct. 7, 2021

(30) Foreign Application Priority Data

May 21, 2018   (EP) ..................................... 18173399

(51) Int. Cl.
*H02J 7/00*   (2006.01)
*H02M 3/335*   (2006.01)

(52) U.S. Cl.
CPC ...... *H02J 7/0068* (2013.01); *H02J 7/007182* (2020.01); *H02M 3/33569* (2013.01)

(58) Field of Classification Search
CPC ............. H02J 7/0068; H02J 7/007182; H02M 3/33569
See application file for complete search history.

(56) References Cited

U.S. PATENT DOCUMENTS

| | | |
|---|---|---|
| 2,575,200 A | 11/1951 | Stanislas |
| 2,675,477 A | 4/1954 | Stanislas |
| 7,332,749 B2 | 2/2008 | Shimizu et al. |

(Continued)

FOREIGN PATENT DOCUMENTS

| | | |
|---|---|---|
| CA | 2298428 A1 | 5/2000 |
| EP | 2427033 A2 | 3/2012 |

(Continued)

OTHER PUBLICATIONS

Ram et al., "Development of High Voltage Pulse Power Supply for Microwave Tube Applications", 14th IEEE India Council International Conference (INDICON), Dec. 15-17, 2017, 5 pages.

(Continued)

*Primary Examiner* — Carlos Amaya
(74) *Attorney, Agent, or Firm* — Condo Roccia Koptiw LLP

(57) ABSTRACT

An output rectifier (10) is disclosed which is electrically connected or connectable in a current path between a power supply (20) and an electrical energy storage module (30). The power supply (20) is configured to supply power to the electrical energy storage module (30) via the output rectifier (10). The output rectifier (10) comprises at least one diode (11, 12, 13, 14) at least in part based on silicon carbide. An arrangement (100) comprising the output rectifier (10) is also disclosed.

20 Claims, 4 Drawing Sheets

(56) References Cited

U.S. PATENT DOCUMENTS

| | | | |
|---|---|---|---|
| 2002/0186577 A1 | 12/2002 | Kirbie | |
| 2015/0076121 A1* | 3/2015 | Krupp | B23K 9/1043 219/112 |
| 2015/0084611 A1 | 3/2015 | Agrawal et al. | |
| 2016/0190955 A1 | 6/2016 | Hatakeyama et al. | |

FOREIGN PATENT DOCUMENTS

| | | |
|---|---|---|
| EP | 2546972 A1 | 1/2013 |
| EP | 2738933 A1 | 6/2014 |
| EP | 2936668 A1 | 10/2015 |
| JP | 2004-007885 A | 1/2004 |
| UA | 46834 U | 1/2010 |
| WO | 2015/091590 A2 | 6/2015 |
| WO | 2015/128397 A1 | 9/2015 |

OTHER PUBLICATIONS

TT Electronics Semelab Limited, "Silicon Carbide Power Schottky Rectifier Diode Bridge", Document No. 8966, Issue 1, Oct. 8, 2010, pp. 1-2.

\* cited by examiner

OUTPUT RECTIFIER AND ARRANGEMENT COMPRISING AN OUTPUT RECTIFIER

CROSS REFERENCE TO RELATED APPLICATIONS

This application is the National Stage Entry under 35 U.S.C. § 371 of Patent Cooperation Treaty Application No. PCT/EP2019/062915, filed 20 May 2019, which claims priority from European Application No. 18173399.9, filed 21 May 2018 the contents of which are hereby incorporated by reference herein in their entireties.

TECHNICAL FIELD

The present invention generally relates to the field of electrical systems. Specifically, the present invention relates to an output rectifier electrically connectable in a current path between a power supply and an electrical energy storage module, wherein the power supply is configured to supply power to the electrical energy storage module via the output rectifier. The present invention further relates to an arrangement comprising a power supply and an electrical energy storage module which are electrically interconnected via the output rectifier, which arrangement can be used for generating at least one electrical pulse.

BACKGROUND

Electrical pulses may be employed in a variety of applications, such as, for example, radar systems, particle accelerators, sterilization equipment, high-energy lasers, microwave systems, or medical devices. In such and other applications it may be desired or required to deliver, or supply, one or more electrical pulses to a load. Systems or circuits which are employed for generating electrical pulses may be referred to as power modulators. Power modulators may employ a pulse transformer in order to obtain the required or desired energy of the electrical pulses. In some applications it may be desired or even required with a capability of providing electrical pulses to a load or a pulse transformer which exhibit a relatively stable current (e.g., exhibiting relatively little variation over time).

SUMMARY

In view of the above, a concern of the present invention is to provide means which may be used in generating electrical pulses, which for example may be supplied to a load or a pulse transformer, and which electrical pulses may exhibit a relatively stable current (e.g., exhibiting relatively little variation over time).

To address at least one of this concern and other concerns, an arrangement in accordance with the independent claim is provided. Preferred embodiments are defined by the dependent claims.

According to a first aspect there is provided an output rectifier. The output rectifier is electrically connectable or connected in a current path between a power supply and an electrical energy storage module, wherein the power supply is configured to supply power to the electrical energy storage module via the output rectifier. The output rectifier comprises at least one diode at least in part based on silicon carbide. For example, the output rectifier may comprise a diode based rectifier circuit comprising at least one diode at least in part based on silicon carbide.

According to a second aspect, there is provided an arrangement comprising a power supply and an electrical energy storage module. The power supply is electrically connected to the electrical energy storage module via an output rectifier according to the first aspect. The power supply is configured to supply power to the electrical energy storage module via the output rectifier.

According to a third aspect, there is provided an arrangement comprising a power supply, an electrical energy storage module, and a load. The power supply is electrically connected to the electrical energy storage module via an output rectifier and the electrical energy storage module is connected to the load, wherein the output rectifier is electrically connected in a current path between the power supply and the electrical energy storage module and the electrical energy storage module is electrically connected in a current path between the output rectifier and the load. The power supply is configured to supply power to the electrical energy storage module via the output rectifier. The output rectifier comprises at least one diode at least in part based on silicon carbide. The electrical energy storage module is configured such that it can be charged or discharged. The arrangement may comprise a switch unit controllably switchable between at least a conducting state and a non-conducting state, wherein the switch unit is electrically connected to the power supply via the output rectifier and to the electrical energy storage module, respectively, such that the power supply charges the electrical energy storage module by way of a charging current supplied by the power supply, or the electrical energy storage module is discharged so as to create an electrical pulse to be received by the load, based on switching of the at least one switch unit between at least the conducting state and the non-conducting state thereof.

In view of the above, the arrangement, e.g., according to the first or second aspect, may comprise an output rectifier according to the first aspect.

The electrical energy storage module—which for example may comprise a capacitor or several capacitors for example arranged so as to form a capacitor bank—may be selectively charged and discharged, partially or (substantially) completely. By the power supply being configured to supply power to the electrical energy storage module via the output rectifier, the electrical energy storage module may be charged by the power supplied thereto from the power supply via the output rectifier. After the electrical energy storage module has been charged (partially or completely), the electrical energy storage module may be discharged (partially or completely), for example for generating at least one electrical pulse, which may be delivered to a load, possibly via a transformer. After the electrical energy storage module has been partially or fully discharged, it may then be (partially or completely) charged again by power supplied thereto from the power supply via the output rectifier, such that the electrical energy storage module is repeatedly (e.g., cyclically or periodically) charged and discharged, whereby a series of electrical pulses may be generated. Thus, the power supply (and possibly the output rectifier) may be considered as a charger system for the electrical energy storage module. In the case where the electrical energy storage module comprises a capacitor or several capacitors for example arranged so as to form a capacitor bank, the power supply (and possibly the output rectifier) may be considered as a capacitor charger system. While in the following the term capacitor charger system may be used, it is to be understood that another or other types of electrical energy storage modules than capacitors may possibly be used, e.g., inductive electrical energy storage modules.

Capacitor charger systems are often used in applications in which electrical pulses with a relatively short duration and a relatively high current are desired or required, such as, for example, in power modulators, particle accelerators, etc. As indicated in the foregoing, the capacitor charger system may charge the capacitor(s), wherein an electrical pulse with a relatively high current may be generated by subsequent discharging (partial or complete) of the capacitor(s). The stability of the current of the electrical pulse may be directly or indirectly dependent on the voltage that is output by the capacitor charger system. Thus, if a relatively stable voltage (e.g., exhibiting relatively little variation over time) is output by the capacitor charger system, a resulting electrical pulse may in turn exhibit a relatively stable current (e.g., exhibiting relatively little variation over time).

The speed of charging the capacitor(s) and the voltage output by the capacitor charger system may be regulated by means of a control system. The stability of the operation of the control system may depend on the precision by which the voltage output by the capacitor charger system can be measured. The voltage output by the capacitor charger system may for example be measured by means of a resistive voltage divider. The voltage output by the capacitor charger system may be distorted for example by high currents which are switched on and off in the capacitor charger system. Such current switching events may generate voltage distortions both relative to a common ground and as voltage variations at the output of the capacitor charger system, which may depend, e.g., on the inductance of the current path (e.g., cable inductance) from the output of the capacitor charger system to the capacitor(s).

In the light of the foregoing, it may be desired or even required to be able to obtain a precise measurement of the voltage output by the capacitor charger system. This may be achieved by increasing stability of voltage output by the capacitor charger system. One way to increase stability of voltage output by the capacitor charger system is to install one or more so called filter capacitors at the output of the capacitor charger system. However, such an arrangement with one or more filter capacitors may increase the overall size of the arrangement to a size which may be undesired or even unfeasible in some applications. Furthermore, an arrangement with one or more so called filter capacitors at the output of the capacitor charger system may in some applications (e.g., for circuit configurations used in some applications) negatively influence the generation of the electrical pulses.

As described in the foregoing, according to the first aspect, a diode-based output rectifier is electrically connectable in a current path between a power supply and an electrical energy storage module, wherein the power supply is configured to supply power to the electrical energy storage module via the output rectifier. The inventors have realized that by employing one or more diodes in the output rectifier which are at least in part based on silicon carbide, a relatively high stability of voltage (e.g., exhibiting relatively little variation over time) that is being input to the electrical energy storage module may be achieved. This may be achieved with relatively little or even no need for providing additional voltage-stabilizing components such as filter capacitors. Thereby, the overall size of the arrangement, e.g., an arrangement according to the second or third aspect, may be kept relatively small.

Silicon carbide (SiC) is a compound semiconductor material comprising silicon and carbon. For example, compared to silicon, silicon carbide generally exhibits a much higher dielectric breakdown field strength and bandgap. Power electronics semiconductor devices based on silicon carbide may be able to withstand higher breakdown voltage, may have a lower resistivity, and may be able to operate at higher temperature compared to power electronics semiconductor devices based on silicon (but not silicon carbide). In particular, compared to diodes based on silicon, diodes based on silicon carbide may have a lower reverse recovery current and recovery time.

In general, in order for a diode to transition from a conducting state to a non-conducting state, the junction charge distribution must change, which can only happen with a movement of charge in the diode, i.e. a flow of current. In diodes based on silicon carbide, the change of junction charge distribution upon transitioning from the conducting state to the non-conducting state may only be caused by junction capacitance, whereby diodes based on silicon carbide may have a relatively low reverse recovery current. Diodes based on silicon (but not silicon carbide) may exhibit relatively high transient currents at the instant that the junction voltage switches from the forward to the reverse direction, which may result in significant switching loss and a relatively high reverse recovery current.

In case of a diode based on silicon (but not silicon carbide) that is a minority carrier semiconductor device, the relatively high transient currents at the instant that the junction voltage switches from the forward to the reverse direction may be at least in part due to that minority carriers are stored in the drift layer during a conduction phase when a forward voltage is applied. The higher the forward current, the longer the reverse recovery time and the larger the reverse recovery current may be. For example, diodes based on silicon carbide such as silicon carbide Schottky barrier diodes may be majority carrier semiconductor devices that do not store minority carriers and use no minority carriers for electrical conduction. Therefore, transient currents in such diodes at the instant that the junction voltage switches from the forward to the reverse direction may be independent, or substantially independent, of forward currents, which hence may not contribute, or contribute only little, to the reverse recovery time and the reverse recovery current in such diodes.

As indicated in the foregoing, the reverse recovery current in diodes based on silicon carbide may only be due to discharging of junction capacitance. Since the reverse recovery current may be relatively small for diodes based on silicon carbide, relatively little noise may be generated from the reverse recovery current. Thereby, diodes based on silicon carbide may be capable of achieving a relatively stable and fast recovery upon the junction voltage switching from the forward to the reverse direction. Consequently, by employing one or more diodes in the output rectifier which are at least in part based on silicon carbide, a relatively high stability of voltage (e.g., exhibiting relatively little variation over time) that is being input to the electrical energy storage module may be achieved.

As mentioned in the foregoing, the output rectifier comprises at least one diode at least in part based on silicon carbide. In the context of the present application, by a diode being at least in part based on silicon carbide, it is meant that the semiconductor component(s) of the diode is/are made partly or (substantially) completely of silicon carbide, or possibly of some material comprising silicon carbide. Possibly, one or more semiconductor components of any other element which may be included in the output rectifier (e.g., a switching element or device such as a transistor) may be at least in part based on silicon carbide.

The output rectifier may for example comprise a plurality of electrically interconnected diodes. At least some diodes of the plurality of diodes may at least in part be based on silicon carbide. The plurality of diodes may for example be electrically interconnected so as to form at least one bridge circuit. However, it is to be understood that another or other types of configurations of the electrical interconnection of the plurality of diodes are possible.

The electrical energy storage module may be configured such that it can be charged or discharged. As mentioned in the foregoing, the electrical energy storage module may for example comprise a capacitor or several capacitors for example arranged so as to form a capacitor bank. The electrical energy storage module may be electrically connected or connectable to a load, possibly via a transformer. The load may be constituted by a transformer, which in turn may be connected to some other component to which it may be desired or required to deliver electrical pulse(s).

The arrangement may comprise a switch unit which may be controllably switchable between at least a conducting state and a non-conducting state. The switch unit may for example comprise one or more semiconductor-based switching elements or components, for example one or more transistors such as, for example, insulated-gate bipolar transistors (IGBTs) and/or metal oxide semiconductor field-effect transistors (MOSFETs), and/or, for example, one or more gate turn-off thyristors (GTOs) and/or integrated gate-commutated thyristors (IGTOs). In the context of the present application, by a non-conducting state of a switch unit it is meant a state where there is no or only very little conduction of current through the switch unit. Thus, the switch unit may be switchable so as to (substantially) stop the switch unit from conducting current.

The arrangement may comprise one or more additional switch units, in addition to the switch unit described in the foregoing, which additional switch unit(s) for example may be electrically connected in parallel with the load.

The switch unit may be electrically connected to the power supply (e.g., via the output rectifier) and to the electrical energy storage module, respectively, such that the power supply charges the electrical energy storage module (partially or completely) by way of a charging current supplied by the power supply, or the electrical energy storage module is discharged (partially or completely) so as to create an electrical pulse to be received by the load, based on switching of the at least one switch unit between at least the conducting state and the non-conducting state thereof. For example, the switch unit may be electrically connected to the power supply (e.g., via the output rectifier) and to the electrical energy storage module, respectively, such that when the switch unit is switched into the non-conducting state, the power supply charges the electrical energy storage module (partially or completely) by way of a charging current supplied by the power supply, and when the switch unit is switched into the conducting state, the electrical energy storage module is discharged (partially or completely) so as to create an electrical pulse to be received by the load.

The switch unit and the load may for example be electrically connected in parallel. Alternatively, the switch unit and the load may be electrically connected in series, and the electrical energy storage module and the output rectifier may be electrically connected in parallel. The switch unit and the output rectifier may for example be electrically connected in parallel.

As indicated in the foregoing, in order to carry out a repeated charging and discharging of the electrical energy storage module, the switch unit may selectively electrically connect or disconnect a power supply with the electrical energy storage module. When the electrical energy storage module has been discharged so as to generate an electrical pulse and the electrical pulse has been terminated, the electrical energy storage module should be charged again in preparation for the next electrical pulse, upon which the switch unit may be switched into an open, or non-conducting state. Due to the sudden disappearance of current when an electrical pulse is terminated, so called flyback may possibly occur in the circuits of the arrangement. In the context of the present application, by flyback it is meant a sudden voltage spike that may be seen across an inductive load (e.g., corresponding to the inductance of one or more electrical conductors connecting the electrical energy storage module and the load (e.g., a transformer)) that has been energized when the inductive load's supply current (e.g., the discharge from the electrical energy storage module) is suddenly reduced or interrupted. Such flyback may damage or even destroy, e.g., the switch unit due to the generally high voltage of the electrical pulses which are generated. To this end, a flyback protection unit may electrically connected to the switch unit for protection thereof against flyback upon the switch unit being opened, or brought into a non-conducting state. Thus, the arrangement may comprise a flyback protection unit which may be electrically connected to the switch unit and which may be configured to protect the switch unit against flyback upon the switch unit being switched into the non-conducting state.

The flyback protection unit may form a current path that bypasses the load (e.g., a transformer). The flyback protection unit may form a current path by which current may bypass the load (e.g., a transformer) when the power supply charges the electrical energy storage module. The flyback protection unit and the switch unit may for example be electrically connected in parallel. The flyback protection unit and the load may be electrically connected in parallel.

The flyback protection unit may for example be constituted by or comprise a diode, or at least one series connection of diodes. The diode(s) comprised in or constituting the flyback protection unit may be referred to as free-wheeling diode(s). Any one or each of the diodes which may be included in the flyback protection unit may comprise, for example, in principle any type of semiconductor diode. Possibly, the flyback protection unit may comprise one or more Zener diodes.

For example, the number of diodes in the at least one series connection of diodes may be chosen such that the voltage drop across the at least one series connection of diodes for the charging current is larger than the voltage drop across the transformer (or load) for the charging current. The at least one series connection of diodes may for example comprise at least four diodes connected in series. The at least one series connection of diodes could possibly comprise at least five diodes connected in series, or at least six or more diodes connected in series. Possibly, the flyback protection unit may comprise at least two series connections of diodes wherein two or more of the series connections of diodes may be electrically connected in parallel.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
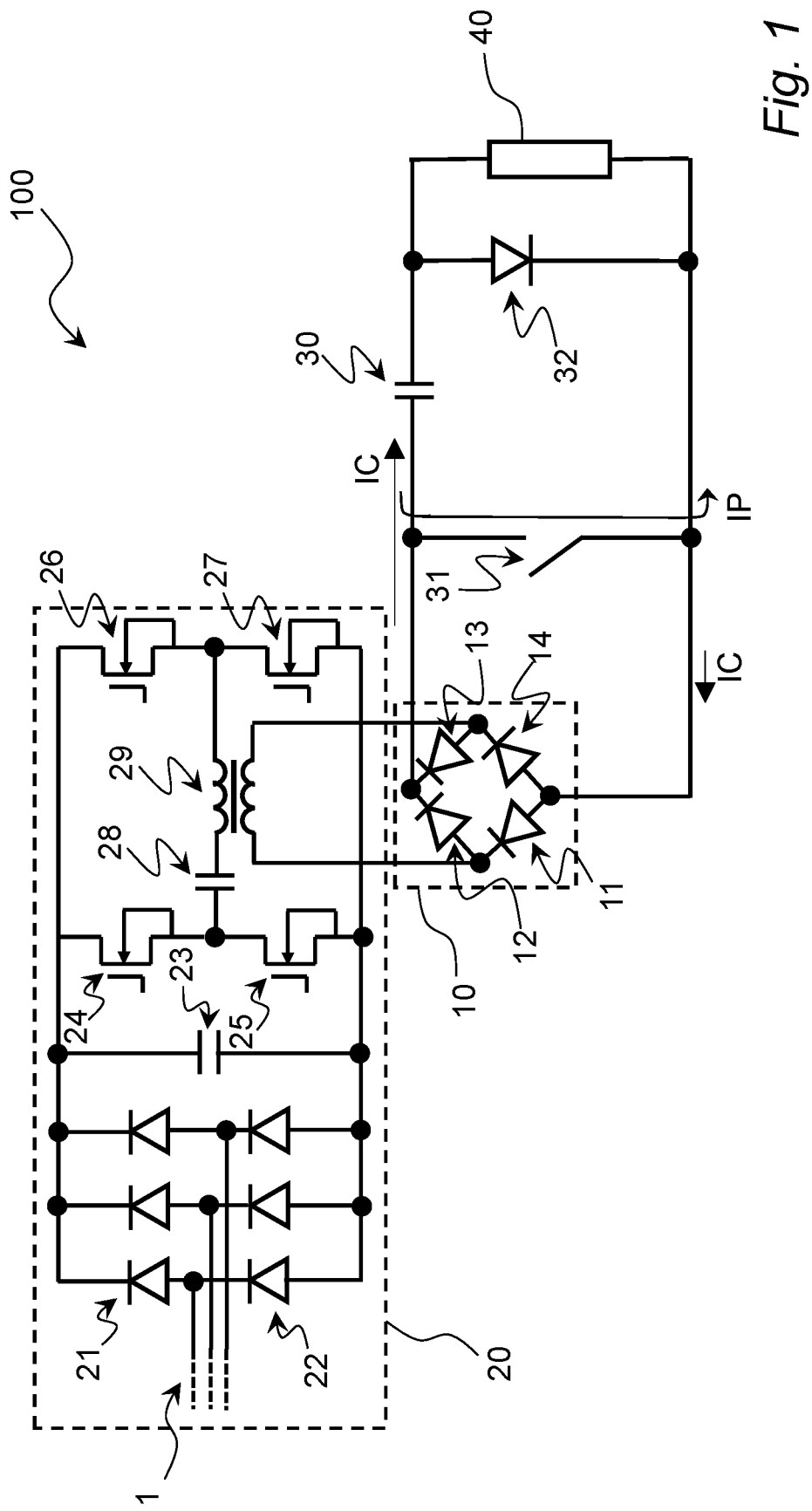
FIGS. 1 to 4 are schematic circuit diagrams of arrangements according to embodiments of the present invention.

FIG. 1 is a schematic circuit diagram of an arrangement 100 according to an embodiment of the present invention. The arrangement 100 comprises a power supply 20 and an electrical energy storage module 30. In accordance with the embodiment of the present invention illustrated in FIG. 1, the electrical energy storage module 30 may for example comprise a capacitor, or possibly several capacitors which may be arranged so as to form a capacitor bank. In the following the electrical energy storage module 30 may be referred to as a capacitor. It is however to be understood that another or other types of electrical energy storage modules than capacitors may possibly be used. The power supply 20 is electrically connected to the electrical energy storage module 30 via an output rectifier 10. The power supply 20 is configured to supply power to the capacitor 30 via the output rectifier 10. As illustrated in FIG. 1, the output rectifier 10 is electrically connected (or electrically connectable) in a current path between the power supply 20 and the capacitor 30. As also illustrated in FIG. 1, the output rectifier 10 may be electrically connected in series with the capacitor 30.

In the following the power supply 20 will be described in greater detail. It is however to be understood that the power supply 20 illustrated in FIG. 1 is according to an example, and that variations are possible. In accordance with the embodiment of the present invention illustrated in FIG. 1, the power supply 20 is based on a resonant full-bridge converter. The resonant power converter comprises a symmetric switch-based bridge network 24, 25, 26, 27, an internal transformer 29, a resonant circuit including a capacitive component for example in the form of a capacitor 28 (or several capacitors). The symmetric switch-based bridge network 24, 25, 26, 27 comprises two pairs of electronically controllable semiconductor switching devices 24, 25 and 26, 27. Any one of each of the semiconductor switching devices 24, 25, 26, 27 may for example comprise one or more IGBTs, MOSFETs, GTOs and/or IGTOs. As illustrated in FIG. 1, the capacitor 28 of the resonant circuit may be connected in a series path with a primary winding of the internal transformer 29. The resonant circuit may further include at least one inductive component (not shown in FIG. 1), which may be connected between the capacitor 28 and the internal transformer 29. The at least one inductive component of the resonant circuit may in addition or in alternative be integrated in the internal transformer 29. For example, the at least one inductive component of the resonant circuit may be integrated with a primary winding of the internal transformer 29. As illustrated in FIG. 1, the power supply 20 may be electrically connected to the output rectifier 10 via a secondary winding of the internal transformer 29. The power supply 20 comprises a diode bridge 21, 22, including a plurality of electrically interconnected diodes 21, 22 (only some of the diodes of the diode bridge are indicated by reference numerals in FIG. 1). As illustrated in FIG. 1, a three-phase Alternating Current (AC) input 1 (e.g., comprising a busbar) is connected to the diode bridge 21, 22. The three-phase AC input 1 may be electrically connected to an AC power source (not shown in FIG. 1).

As indicated in the foregoing, it is to be understood that the power supply 20 illustrated in FIG. 1 is according to an example, and that variations are possible. For example, while the illustrated power supply 20 comprises a three-phase AC input 1, the power supply 20 could in accordance with one or more other embodiments of the present invention comprise a one-phase AC input, or a Direct Current (DC) input. Also, while the illustrated power supply 20 comprises a full-bridge circuit, the power supply 20 could in accordance with one or more other embodiments of the present invention for example comprise a half-bridge circuit.

The output rectifier 10 may comprise a diode based rectifier circuit. The output rectifier 10 comprises at least one diode at least in part based on silicon carbide. The output rectifier 10 may comprise plurality of electrically interconnected diodes, for example four electrically interconnected diodes 11, 12, 13, 14, such as illustrated in FIG. 1. It is however to be understood that the output rectifier 10 could comprise less or more than four diodes, and possibly only a single diode. In accordance with the embodiment of the present invention illustrated in FIG. 1, the diodes 11, 12, 13, 14 are electrically interconnected so as to form a bridge circuit. It is however to be understood that the configuration of the electrical interconnection of the diodes 11, 12, 13, 14 illustrated in FIG. 1 is according to an example, and that variations are possible. At least one, some, or even all of the diodes 11, 12, 13, 14 of the output rectifier 10 may be at least in part based on silicon carbide. This may imply that the semiconductor component(s) of at least one, some or even all of the diodes 11, 12, 13, 14 may be made partly or (substantially) completely of silicon carbide, or possibly of some material comprising silicon carbide. In accordance with an embodiment of the present invention, each diode 11, 12, 13, 14 of the output rectifier 10 may be a silicon carbide based diode.

The arrangement 100 comprises a switch unit 31. The switch unit 31 is controllably switchable between at least a conducting state and a non-conducting state. The switch unit 31 may for example comprise one or more semiconductor-based switching elements or components, such as, for example, one or more IGBTs, MOSFETs, GTOs and/or IGTOs. The capacitor 30 can be charged or discharged. The switch unit 31 is electrically connected to the power supply 20 (via the output rectifier 10) and to the capacitor 30, respectively, such that when the switch unit 31 is switched into the non-conducting state, the power supply 20 charges the electrical energy storage module by way of a charging current supplied by the power supply 20, and when the switch unit 31 is switched into the conducting state, the capacitor 30 is discharged so as to create an electrical pulse. The capacitor 30 is electrically connected to a load 40, such that electrical pulse(s) created by discharge of the capacitor 30 is/are received by the load 40. As illustrated in FIG. 1, the switch unit 31 and the load 40 may be electrically connected in parallel. And as further illustrated in FIG. 1, the switch unit 31 and the output rectifier 10 may be electrically connected in parallel.

In accordance with the embodiment of the present invention illustrated in FIG. 1, the charging current that is supplied by the power supply 20 via the output rectifier 10 when the switch unit 31 is switched into the non-conducting state may flow out of the power supply 20 via the conductor of the two conductors connected to the power supply 20 via the output rectifier 10 that is uppermost in FIG. 1, and return to the power supply 30 via the conductor of the two conductors connected to the power supply 20 via the output rectifier 10 that is lowermost in FIG. 1, as indicated by the arrows IC in FIG. 1. The two above-mentioned conductors may for example be connected to two terminals of the output rectifier 10, as illustrated in FIG. 1.

Further in accordance with the embodiment of the present invention illustrated in FIG. 1, an electrical pulse, which is generated when the electrical energy storage module 30 is discharged upon the switch unit 31 being switched into the conducting state, may flow in the direction indicated by the arrow IP in FIG. 1. The duration of an electrical pulse may for example be 1 ms or about 1 ms, but is not limited thereto, and could be longer, or shorter.

The load 40 may comprise or be constituted by a transformer, which in turn may be connected to some other component (not shown in FIG. 1) to which it may be desired or required to deliver electrical pulse(s).

The arrangement 100 comprises a flyback protection unit 32. The flyback protection unit 32 is electrically connected to the switch unit 31 and which is configured to protect the switch unit 31 against flyback upon the switch unit 31 being switched into the non-conducting state. As illustrated in FIG. 1, the flyback protection unit 32 and the switch unit 31 may be electrically connected in parallel. And as further illustrated in FIG. 1, the flyback protection unit 32 and the load 40 may be electrically connected in parallel.

In accordance with the embodiment of the present invention illustrated in FIG. 1, the flyback protection unit 32 comprises a diode, which may be referred to as a freewheeling diode.

In accordance with one or more other embodiments of the present invention, the flyback protection unit 32 could comprise several diodes, for example arranged in at least one series connection of diodes, and possibly several series connections of diodes with the different series connections being electrically connected in parallel in relation to each other.

Any diode which may be included in the flyback protection unit 32 may comprise, for example, in principle any type of semiconductor diode, possibly a Zener diode.

For example, the switch unit 31 may during the delivery of an electrical pulse have been switched into the conducting state for such a period of time that an inductance (not shown) between the switch unit 31 and the load 40 has been fully energized. The inductance may possibly not be a separate electrical component in the arrangement 100, but could for example be the inductance of the conductor between the flyback protection circuit 32 and the load 40. When the switch unit 31 is switched into the non-conducting state, the discharge from the capacitor 30 may be suddenly reduced or interrupted. This may entail that a surge of voltage, or voltage spike, is created, which in turn may cause an overvoltage condition in the switch unit 31 that may damage or even destroy the switch unit 31. The flyback protection unit 32 may protect against such an overvoltage condition in the switch unit 31 by allowing for the inductance to draw current from itself in a continuous circuit until the energy in the inductance has been sufficiently dissipated, e.g., by means of resistive losses in conductors in the arrangement 100.

The flyback protection unit 32 is arranged in a current path which bypasses the load 40. This may for example be implemented by means of an electrical configuration such as illustrated in FIG. 1. In accordance with the embodiment of the present invention illustrated in FIG. 1, the flyback protection unit 32 and the switch unit 31 may be electrically connected in parallel, and the flyback protection unit 32 and the load 40 may in addition or alternatively be electrically connected in parallel.

The flyback protection unit 32 may be configured such that a relation between the voltage drop across the flyback protection unit 32 for the charging current and the voltage drop across the load 40 for the charging current is such so as to cause the charging current, which may be supplied by the power supply 20 via the output rectifier 10 when the switch unit 31 is switched into the non-conducting state, to be directed via the load 40 at least to some extent. Thus, by means of the above-mentioned configuration of the flyback protection unit 32, at least a part or portion of the charging current may be directed via the load 40 (which, e.g., may comprise a transformer), and not only via the current path in which the flyback protection unit 32 is arranged and which current path bypasses the load 40.

As indicated in the foregoing, the load 40 may be constituted by or comprise a transformer, which in the following will be referred to as a load transformer (or pulse transformer). The charging current, or at least a part or portion thereof, may be directed via the load transformer by means of the charging current or at least a part or portion thereof being conveyed through the winding(s) of the load transformer. Between electrical pulses—e.g., after an electrical pulse has been terminated and during the charging of the capacitor 30 in preparation for starting delivery of the next electrical pulse to the load transformer—the core of the load transformer should preferably be reset to its proper magnetic operating point, for example by removing all, or substantially all, energy from the core. Alternatively, the core may not be demagnetized when the next electrical pulse begins, but may for example be reset to a magnetic operating point in which the core is magnetized so as to exhibit a negative magnetic field strength. For example, provided the magnetic field strength of the core can vary between $-B_1$ and $B_1$, where $B_1 > 0$, the core may be reset (or 'biased') prior to the next electrical pulse begins so that it has a magnetic field strength $-B_1$. The 'available' operating range of the load transformer before saturation of the core of the load transformer possibly may occur could then hence be $2B_1$. By resetting the core after each electrical pulse that has been delivered to the load transformer, the full—or a substantially full—operating range of the load transformer may be available for the next electrical pulse that is received by the load transformer. The voltage drop across the flyback protection unit 32 for the charging current may determine the voltage over the load transformer (e.g., the voltage over at least one (primary) winding of the load transformer), which in turn may govern the extent to which the part or portion of the charging current that is directed via the load transformer contributes to the resetting of the core.

Figure 2:
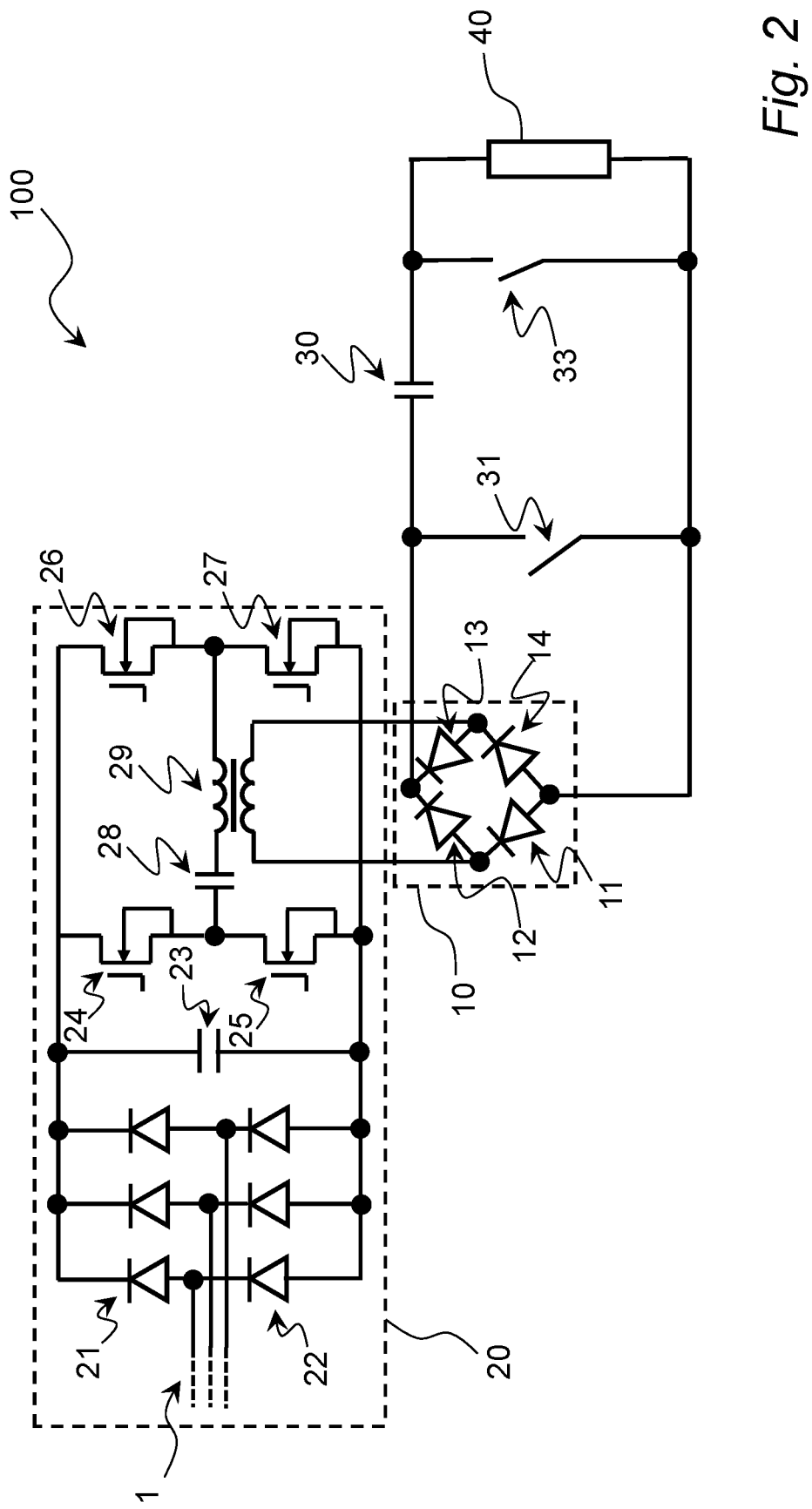

FIG. 2 is a schematic circuit diagram of an arrangement 100 according to another embodiment of the present invention. The arrangement 100 illustrated in FIG. 2 is similar to the arrangement 100 illustrated in FIG. 1, and the same reference numerals in FIGS. 1 and 2 indicate the same or similar components, having the same or similar function.

The arrangement 100 illustrated in FIG. 2 differs from the arrangement 100 illustrated in FIG. 1 in that the flyback protection unit 32 illustrated in FIG. 1 has been replaced with a switch unit 33, which may be located in the same or a similar position in relation to the other components of the arrangement 100 (and be similarly electrically connected to the other components) as the flyback protection unit 32. The switch unit 33 may be controllably switchable between at least a conducting state and a non-conducting state, and may for example comprise one or more semiconductor-based switching elements or components, such as, for example, one or more IGBTs, MOSFETs, GTOs and/or IGTOs. As illustrated in FIG. 2, the switch units 31 and 33 may for example be electrically connected in parallel. And as further illustrated in FIG. 2, the switch unit 33 and the load 40 may be electrically connected in parallel.

The switch unit 33 may provide functionality that is similar to functionality of the flyback protection unit 32 illustrated in FIG. 1. For example, during charging of the capacitor 30, by means of a charging current supplied by the power supply 20 when the switch unit 31 is into the non-conducting state as described in the foregoing, by switching the switch unit 33 into a non-conducting state, it may be ensured that at least a part or portion of the charging current may be directed via the load 40 (which, e.g., may comprise a transformer).

Figure 3:
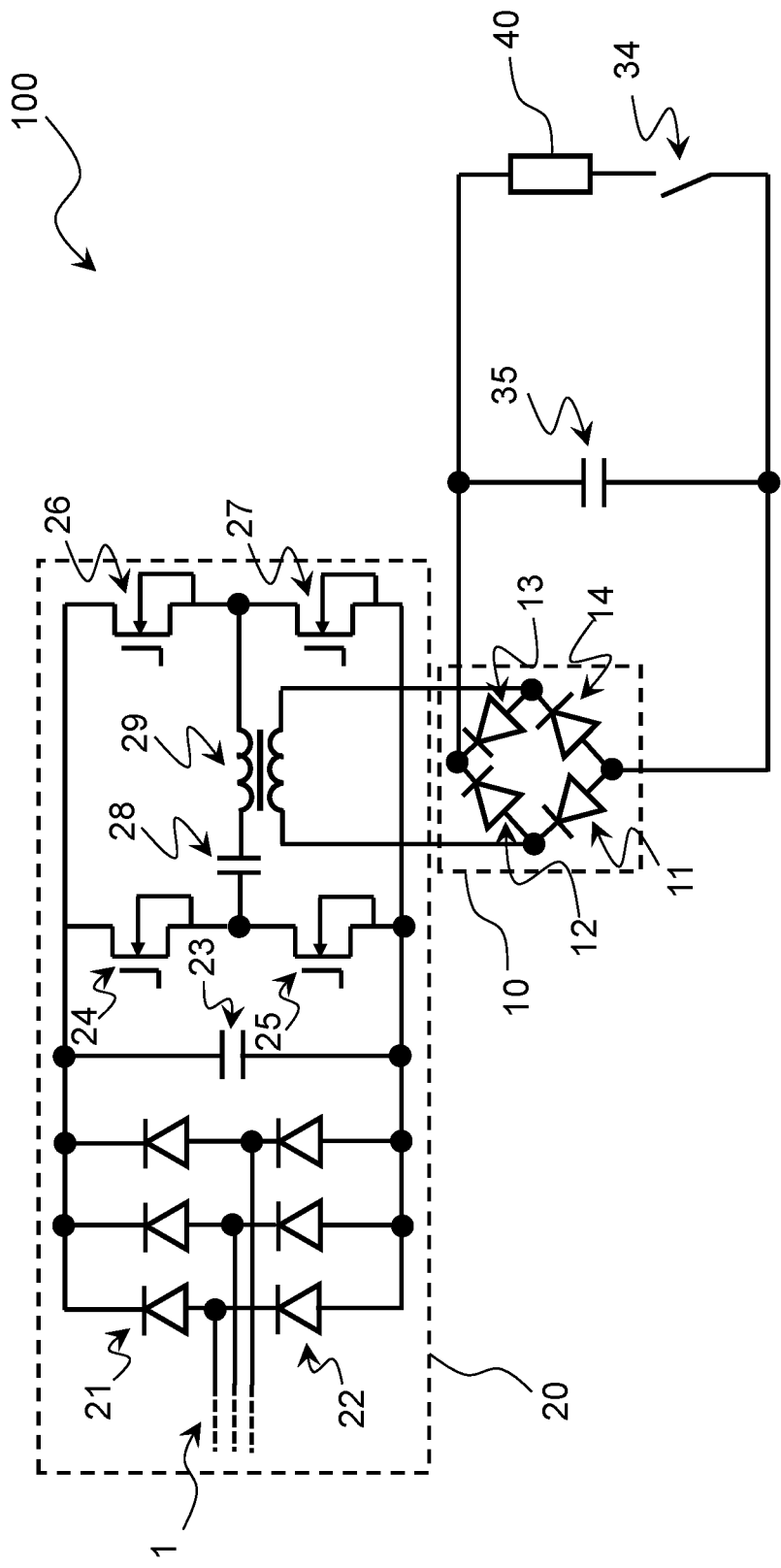

FIG. 3 is a schematic circuit diagram of an arrangement 100 according to another embodiment of the present invention. The arrangement 100 illustrated in FIG. 3 is similar to the arrangement 100 illustrated in FIG. 1, and the same reference numerals in FIGS. 1 and 3 indicate the same or similar components, having the same or similar function.

The arrangement 100 illustrated in FIG. 3 differs from the arrangement 100 illustrated in FIG. 1 in that it does not include the flyback protection unit 32 illustrated in FIG. 1. The arrangement 100 illustrated in FIG. 3 differs from the arrangement 100 illustrated in FIG. 1 in that it comprises an electrical energy storage module 35 which is electrically connected in parallel with the output rectifier 10.

In accordance with the embodiment of the present invention illustrated in FIG. 3, the electrical energy storage module 35 may for example may comprise a capacitor, or possibly several capacitors which may be arranged so as to form a capacitor bank. In the following the electrical energy storage module 35 may be referred to as a capacitor. It is however to be understood that another or other types of electrical energy storage modules than capacitors may possibly be used. By arranging the capacitor 35 in parallel with the output rectifier 10, the capacitor 35 may exhibit a functionality similar to a filter capacitor, and which may provide for a relatively high stability of voltage output from the output rectifier 10.

The arrangement 100 illustrated in FIG. 3 differs from the arrangement 100 illustrated in FIG. 1 in that it comprises a switch unit 34 which is electrically connected in series with the load 40. The capacitor 35 can be charged or discharged. The switch unit 34 is electrically connected to the power supply 20 (via the output rectifier 10) and to the capacitor 35, respectively, such that when the switch unit 34 is switched into the non-conducting state, the power supply 20 charges the capacitor 35 by way of a charging current supplied by the power supply 20, and when the switch unit 34 is switched into the conducting state, the capacitor 20 is discharged so as to create an electrical pulse. The capacitor 34 is electrically connected to the load 40, such that electrical pulse(s) created by discharge of the capacitor 35 is/are received by the load 40.

Figure 4:
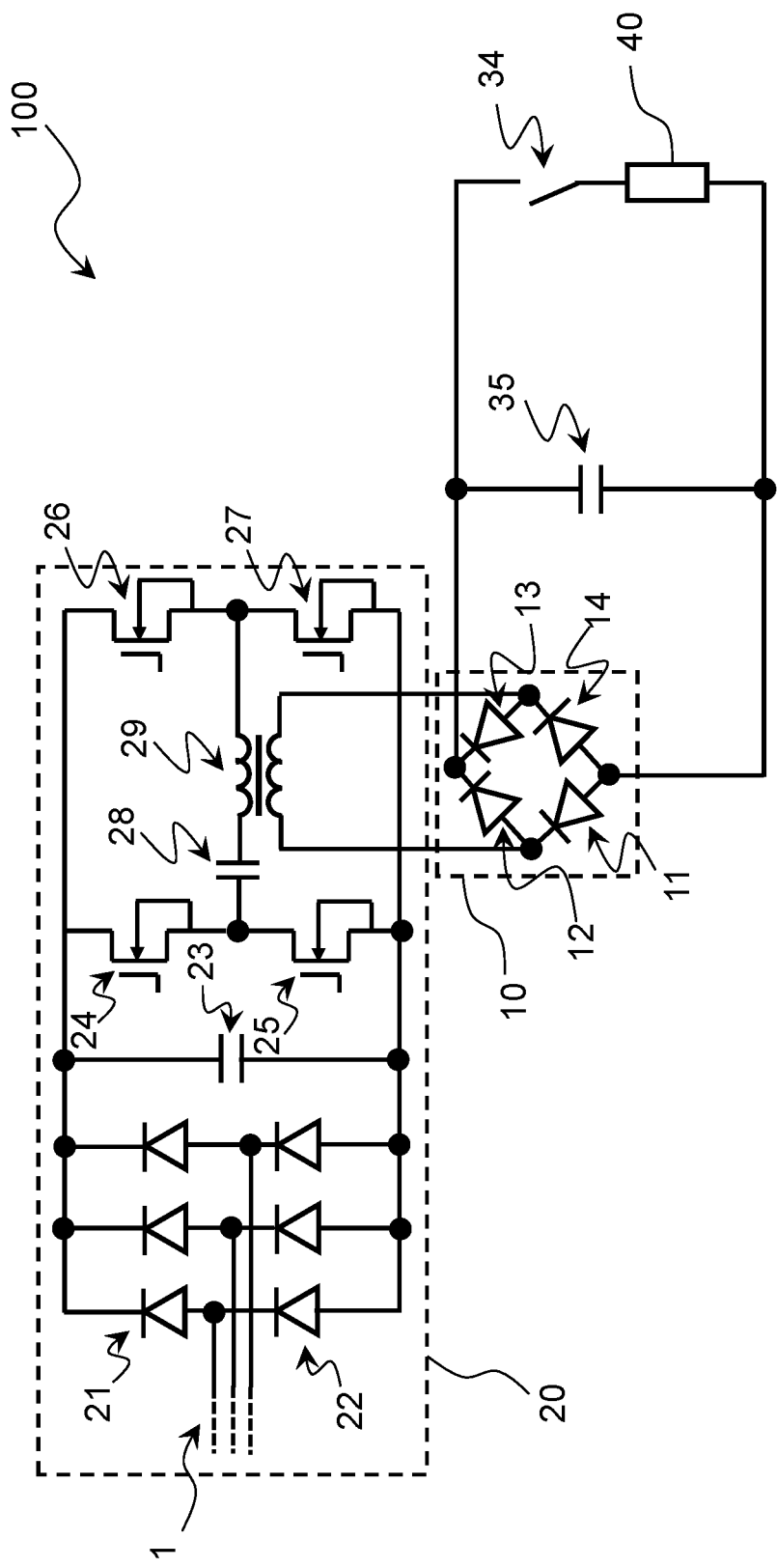

FIG. 4 is a schematic circuit diagram of an arrangement 100 according to another embodiment of the present invention. The arrangement 100 illustrated in FIG. 4 is similar to the arrangement 100 illustrated in FIG. 3, and the same reference numerals in FIGS. 3 and 4 indicate the same or similar components, having the same or similar function. The arrangement 100 illustrated in FIG. 4 differs from the arrangement 100 illustrated in FIG. 3 in that that the positions of the switch unit 34 and the load 40 have been changed. Similarly to the arrangement 100 illustrated in FIG. 3, in the arrangement 100 illustrated in FIG. 4, the switch unit 34 is electrically connected to the power supply 20 (via the output rectifier 10) and to the capacitor 35, respectively, such that when the switch unit 34 is switched into the non-conducting state, the power supply 20 charges the capacitor 35 by way of a charging current supplied by the power supply 20, and when the switch unit 34 is switched into the conducting state, the capacitor 20 is discharged so as to create an electrical pulse. The capacitor 34 is electrically connected to the load 40, such that electrical pulse(s) created by discharge of the capacitor 35 is/are received by the load 40.

In conclusion, an output rectifier is disclosed, which is connected or connectable (or electrically connected or connectable) in a current path between a power supply and an electrical energy storage module. The output rectifier comprises at least one diode at least in part based on silicon carbide. An arrangement comprising the output rectifier is also disclosed.

Various aspects of the present invention may be appreciated from the following enumerated example embodiments (EEEs):

EEE 1. An output rectifier (10) electrically connectable in a current path between a power supply (20) and an electrical energy storage module (30; 35), wherein the power supply is configured to supply power to the electrical energy storage module via the output rectifier, the output rectifier comprising at least one diode (11, 12, 13, 14) at least in part based on silicon carbide.

EEE 2. An output rectifier according to EEE 1, comprising a plurality of electrically interconnected diodes (11, 12, 13, 14), wherein at least some diodes of the plurality of diodes are at least in part based on silicon carbide.

EEE 3. An output rectifier according to EEE 1 or 2, comprising a plurality of diodes (11, 12, 13, 14) electrically interconnected so as to form at least one bridge circuit, wherein at least some diodes of the plurality of diodes are at least in part based on silicon carbide.

EEE 4. An arrangement (100) comprising:
 a power supply (20); and
 an electrical energy storage module (30; 35);
 wherein the power supply is electrically connected to the electrical energy storage module via an output rectifier (10) according to any one of EEEs 1-3, the power supply being configured to supply power to the electrical energy storage module via the output rectifier.

EEE 5. An arrangement according to EEE 4, wherein the electrical energy storage module is configured such that it can be charged or discharged, and wherein the electrical energy storage module is electrically connected to a load (40), wherein the arrangement further comprises:
a switch unit (31) controllably switchable between at least a conducting state and a non-conducting state, wherein the switch unit is electrically connected to the power supply and to the electrical energy storage module, respectively, such that the power supply charges the electrical energy storage module by way of a charging current supplied by the power supply, or the electrical energy storage module is discharged so as to create an electrical pulse to be received by the load, based on switching of the at least one switch unit between at least the conducting state and the non-conducting state thereof.

EEE 6. An arrangement according to EEE 5, wherein the switch unit and the load are electrically connected in parallel.

EEE 7. An arrangement according to EEE 5, wherein the switch unit and the load are electrically connected in series, and wherein the electrical energy storage module and the output rectifier are electrically connected in parallel.

EEE 8. An arrangement according to any one of EEEs 5-7, wherein the switch unit and the output rectifier are electrically connected in parallel.

EEE 9. An arrangement according to any one of EEEs 5-8, further comprising:
a flyback protection unit (32) electrically connected to the switch unit and configured to protect the switch unit against flyback upon the switch unit being switched into the non-conducting state.

EEE 10. An arrangement according to EEE 9, wherein the flyback protection unit comprises a diode or at least one series connection of diodes.

EEE 11. An arrangement according to any one of EEEs 9-10, wherein the flyback protection unit and the switch unit are electrically connected in parallel.

EEE 12. An arrangement according to any one of EEEs 9-11, wherein the flyback protection unit and the load are electrically connected in parallel.

EEE 13. An arrangement according to any one of EEEs 5-12, further comprising one or more additional switch units electrically connected in parallel with the load.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An arrangement comprising:
a power supply;
an electrical energy storage module; and
a load;
wherein the power supply is electrically connected to the electrical energy storage module via an output rectifier and the electrical energy storage module is connected to the load, wherein the output rectifier is electrically connected in a current path between the power supply and the electrical energy storage module and the electrical energy storage module is electrically connected in a current path between the output rectifier and the load, and wherein the power supply is configured to supply power to the electrical energy storage module via the output rectifier, and wherein the output rectifier comprises at least one diode at least in part based on silicon carbide;
wherein the electrical energy storage module is configured such that it can be charged or discharged, and wherein the arrangement further comprises:
a switch unit controllably switchable between at least a conducting state and a non-conducting state, wherein the switch unit is electrically connected to the power supply via the output rectifier and to the electrical energy storage module, respectively, such that the power supply charges the electrical energy storage module by way of a charging current supplied by the power supply, or the electrical energy storage module is discharged so as to create an electrical pulse to be received by the load, based on switching of the at least one switch unit between at least the conducting state and the non-conducting state thereof; wherein the power supply and the output rectifier comprise an electrical energy storage module charger system for charging the electrical energy storage module, and wherein the arrangement further comprises:
a control system configured to regulate the speed of charging the electrical energy storage module by the electrical energy storage module charger system and the voltage output by the electrical energy storage module charger system based on measured voltage output by the electrical energy storage module charger system.

2. The arrangement of claim 1, wherein the output rectifier comprises a plurality of electrically interconnected diodes, wherein at least some diodes of the plurality of diodes are at least in part based on silicon carbide.

3. The arrangement of claim 1, wherein the output rectifier comprises a plurality of diodes electrically interconnected so as to form at least one bridge circuit, wherein at least some diodes of the plurality of diodes are at least in part based on silicon carbide.

4. The arrangement of claim 1, wherein the switch unit and the load are electrically connected in parallel.

5. The arrangement of claim 1, wherein the switch unit and the load are electrically connected in series, and wherein the electrical energy storage module and the output rectifier are electrically connected in parallel.

6. The arrangement of claim 1, wherein the switch unit and the output rectifier are electrically connected in parallel.

7. The arrangement of claim 1, further comprising a flyback protection unit electrically connected to the switch unit and configured to protect the switch unit against flyback upon the switch unit being switched into the non-conducting state.

8. The arrangement of claim 7, wherein the flyback protection unit comprises a diode or at least one series connection of diodes.

9. The arrangement of claim 7, wherein the flyback protection unit and the switch unit are electrically connected in parallel.

10. The arrangement of claim 7, wherein the flyback protection unit and the load are electrically connected in parallel.

11. The arrangement of claim 1, further comprising one or more additional switch units electrically connected in parallel with the load.

12. A system comprising:
an electrical energy storage module having a connection to a power supply via an output rectifier and a connection to a load, wherein the output rectifier is electrically connected in a current path between the power supply and the electrical energy storage module, wherein the output rectifier comprises at least one diode at least in part based on silicon carbide, wherein the electrical energy storage module is electrically connected in a current path between the output rectifier and the load, and wherein the electrical energy storage module is configured such that it can be charged by the power supply or discharged so as to create an electrical pulse to be received by the load;
a switch unit electrically connected to the output rectifier and to the electrical energy storage module, wherein the switch unit is controllably switchable between at least a conducting state and a non-conducting state; and
a control system configured to regulate the speed of charging the electrical energy storage module and the voltage output by the power supply via the output rectifier based on measured voltage output.

13. The system of claim 12, wherein the output rectifier comprises a plurality of electrically interconnected diodes, wherein at least some diodes of the plurality of diodes are at least in part based on silicon carbide.

14. The system of claim 12, wherein the output rectifier comprises a plurality of diodes electrically interconnected so as to form at least one bridge circuit, wherein at least some diodes of the plurality of diodes are at least in part based on silicon carbide.

15. The system of claim 12, wherein the switch unit and the load are electrically connected in parallel.

16. The system of claim 12, wherein the switch unit and the load are electrically connected in series, and wherein the electrical energy storage module and the output rectifier are electrically connected in parallel.

17. The system of claim 12, wherein the switch unit and the output rectifier are electrically connected in parallel.

18. The system of claim 12, further comprising a flyback protection unit electrically connected to the switch unit and configured to protect the switch unit against flyback upon the switch unit being switched into the non-conducting state.

19. The system of claim 18, wherein the flyback protection unit comprises a diode or at least one series connection of diodes.

20. The system of claim 18, wherein the flyback protection unit and at least one of the switch unit or the load are electrically connected in parallel.

* * * * *